United States Patent [19]

Kurasawa et al.

[11] 3,811,702

[45] May 21, 1974

[54] SAFETY DEVICE FOR MOTOR VEHICLE

[75] Inventors: Yoshiya Kurasawa, Yokohama; Syuichi Otani, Tokyo, both of Japan

[73] Assignee: Nissan Motor Company, Limited, Yokohama City, Japan

[22] Filed: June 5, 1972

[21] Appl. No.: 259,768

[30] Foreign Application Priority Data
July 15, 1971   Japan.......................... 46-62393[U]

[52] U.S. Cl............. 280/150 SB, 297/386, 297/389
[51] Int. Cl............................................. B60r 21/10
[58] Field of Search.... 280/150 SB, 150 B, 150 AB; 188/1 C; 297/386, 384, 385, 387–390

[56] References Cited
UNITED STATES PATENTS

| | | |
|---|---|---|
| 3,484,134 | 12/1969 | Townsend ..................... 280/150 SB |
| 2,880,815 | 4/1959 | Apfelbaum..................... 280/150 SB |
| 3,431,019 | 3/1969 | Lewis................................... 188/1 C |
| 2,680,476 | 6/1954 | Saffell................................ 297/386 |
| 3,348,881 | 10/1967 | Weman ....................... 280/150 SB |
| 3,708,179 | 1/1973 | Hulten......................... 280/150 AB |
| 3,708,194 | 1/1973 | Amit............................ 280/150 AB |

FOREIGN PATENTS OR APPLICATIONS

| | | |
|---|---|---|
| 1,430,398 | 11/1968 | Germany..................... 280/150 SB |

Primary Examiner—M. Henson Wood, Jr.
Assistant Examiner—Reinhard J. Eisenzopf

[57] ABSTRACT

A safety device for protecting a vehicle occupant from injury during a collision of a motor vehicle, which device includes a seat belt extending over the seat portion of a seat of the motor vehicle, and a shock absorber associated with the seat belt for absorbing an energy of the vehicle occupant due to a sudden deceleration of the motor vehicle when the motor vehicle encounters the collision. The shock absorber includes a cylinder body having a fluid chamber containing therein a fluid, the cylinder body being connected at one end to a leading end of the seat belt, a piston slidably disposed in the fluid chamber of the cylinder body, a connecting rod connected to the piston and movable therewith, a coupling means having one end connected to the other end of the cylinder body and the other end pivotally connected to a structural part of the motor vehicle, and destructible retaining means provided for connecting the other end of the cylinder body to the destructible means for retaining the piston in a rest position, the retaining means being destroyable when the seat belt connected to the cylinder body is subjected to a predetermined magnitude of tension due to the forward movement of the vehicle occupant during the collision of the motor vehicle.

1 Claim, 4 Drawing Figures

SAFETY DEVICE FOR MOTOR VEHICLE

This invention relates in general to safety devices for motor vehicles and, more particularly, to a safety device for passengers of the motor vehicles, the device being particularly designed to be applied to various motor vehicles for restraining the vehicle occupants or passengers from being thrown forward or injuried in case of an accident or a collision and adapted to be applied on or around the body of the motor vehicle occupant.

It is presently one of the mandatory requirements in many countries to have the motor vehicles equipped with safety devices to provide some sort of restraint for the vehicle occupants for the purpose of protecting the vehicle occupants from injury in the event of the motor vehicle encounters a collision during cruising. A large number of fatalities and injuries can be avoided if proper safety devices are placed on the motor vehicle and if the persons use the safety devices. As is well known, when the motor vehicle is involved in a collision, the motor vehicle may be stopped but the tendency of the body of the vehicle occupant is to move forward and crash through the windshield, etc., or against some other object causing injury or fatality. It is believed that there is no other effective way to minimize injuries and fatalities resulting from accidents than to furnish proper safety devices for use of the motor vehicle occupants.

Among the known motor vehicle safety devices of the type having seat belts is a lap belt which is intended to protect the vehicle occupant from being flung from the seat through restraint of the occupant at his laps or thighs. Another version of the known seat belts is a combination lap belt and shoulder strap safety device having a lap belt to restrain the vehicle occupant's laps or thighs and one or more shoulder straps which are adapted to receive the vehicle occupant at his torso and shoulder. While these prior art seat belts for partial body restraint have been effective for certain types of relatively minor decelerations of the vehicle occupants arising from the collision of the motor vehicle, they have proved unsatisfactory for the purpose of absorbing the energy of the vehicle occupant during the collision condition of the motor vehicle. This is particularly significant when the motor vehicle encounters a head-on collision with some obstruction in the event the motor vehicle is running at a speed above 30 – 40 Km/h.

The present invention contemplates resolution of all of these drawbacks which have thus far been inherent in the prior art safety devices of the seat belt type.

It is, therefore, an object of the present invention to provide an improved safety device which is adapted to satisfactorily absorb the energy of the vehicle occupant during the collision of the motor vehicle for thereby protecting the vehicle occupant from injury or fatality.

Another object of the present invention is to provide an improved safety device which is adapted to provide a satisfactory restraint for the vehicle occupant during the collision condition of the motor vehicle without causing any significant modifications or changes in the passenger compartment of the motor vehicle.

A still another object of the present invention is to provide an improved safety device which is simple in construction, easy to manufacture and ready for being compactly installed in a limited working space such as the cabin of the motor vehicle.

In general, these and other objects and advantages of the present invention are attained in a safety device which consists of a seat belt extending over the seat portion of a seat of a motor vehicle, and a shock absorber associated with the seat belt for absorbing the energy of the vehicle occupant due to a sudden deceleration of the motor vehicle when the motor vehicle encounters a collision. The shock absorber includes a cylinder body having a fluid chamber containing a fluid therein. The cylinder body is connected at its one end to an end portion of the seat belt. A piston is slidably disposed in the fluid chamber of the cylinder body and is connected to a connecting rod, which is connected to a coupling means pivotally mounted on a structural part of the motor vehicle. A destructible retaining means is provided for connecting the cylinder body at its other end to the coupling means pivotally mounted on the structural part of the motor vehicle for retaining the piston in its rest or inoperative position. The retaining means is adapted to be destroyable when the seat belt connected to the cylinder body is subjected to a predetermined magnitude of tension due to the forward movement of the vehicle occupant during the collision of the motor vehicle. The shock absorber is further provided with a retracting means which is located between the end portion of the seat belt and the one end of the cylinder body thereby to maintain the seat belt in its retracted condition. An assembly consisting of the cylinder body, coupling means and retracting means may be received in a longitudinally extending cavity formed in a housing member, which is released from the assembly during the collision of the motor vehicle. Where the seat belt system comprises only a lap belt which extends over and across the seat portion of the seat, the shock absorber is mounted on a floor pan at a suitable location thereof and is operatively connected to one end portion of the lap belt so as to absorb the energy of the vehicle occupant in a satisfactory fashion. Where the seat belt system comprises, in addition to the lap belt, a shoulder strap which is anchored at one end to an intermediate portion of the lap belt, the shock absorber is mounted on the ceiling of the motor vehicle at a suitable location thereof and is operatively connected to an upper end portion of the shoulder strap.

These and other objects and advantages of the present invention will become more apparent when taken in conjunction with the accompanying drawings, in which.

Figure 1:
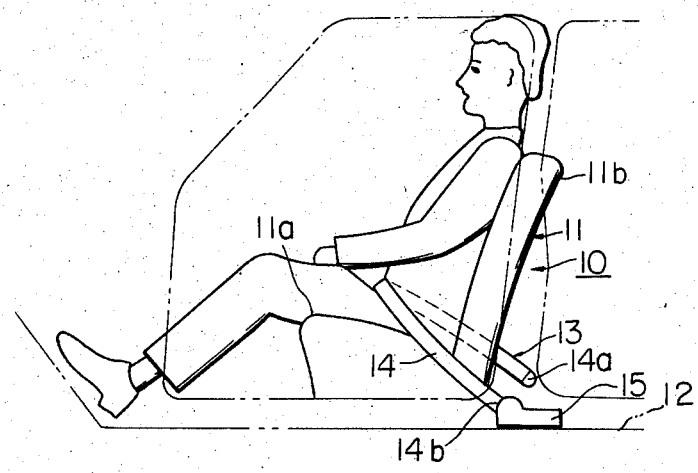
FIG. 1 is a fragmentary side view of a preferred embodiment of the safety device according to the present invention.

Referring now to the drawings and more particularly to FIG. 1, there is schematically shown the general construction of the safety device according to the present invention, which is generally designated at reference numeral 10. As noted at an outset of this description, the safety device is assumed to be mounted on a seat in a motor vehicle for illustrative purposes. This seat, designated by reference numeral 11, includes a generally horizontal seat portion 11a and a generally upright seat back portion 11b, as is customary, and is held stationary relative to a floor pan 12 of the motor vehicle structure.

As shown, the safety device 10 consists of the seat belt which is generally indicated at 13. In FIG. 1, the seat belt 13 is shown to include a cross or lap belt 14 which is secured at one end to the floor pan 12 as at 14a and at the other end to a shock absorber 15 as at 14b and which extends over the seat portion 11a of the seat 11 in such a manner that it crosses thighs or laps of a vehicle occupant or passenger carried on the seat 11. In the illustrated embodiment of FIG. 1, the shock absorber 15 is anchored to the floor pan 12 at a suitable location thereof and associated with the lap belt 14 for absorbing the energy of the vehicle occupant resulting from the forward movement of the latter due to a sudden deceleration caused by a collision of the motor vehicle.

Figure 2:
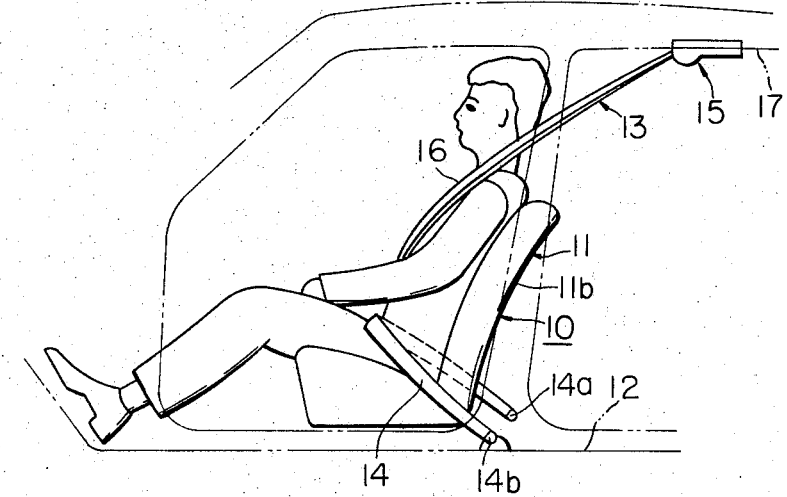
FIG. 2 is a fragmentary view of another preferred embodiment of the safety device according to the present invention.

In the illustrated embodiment of FIG. 2, the lap belt 14 is shown as anchored at both ends to the floor pan 12 as at 14a and 14b. In this embodiment, the seat belt 13 further includes a generally vertical shoulder strap 16 which is connected at its lowermost end to an intermediate portion of the lap belt 14 through a conventional connecting means such as buckle connection, though not shown. The shoulder strap 16 is directed substantially upwardly and backwardly of the seat back portion 11b of the seat 11 in a manner to extend across the vehicle occupant's chest and shoulder and is anchored at its leading end to a ceiling structure 17 of the cabin of the motor vehicle through an assembly of the shock absorber 15.

Figure 3:
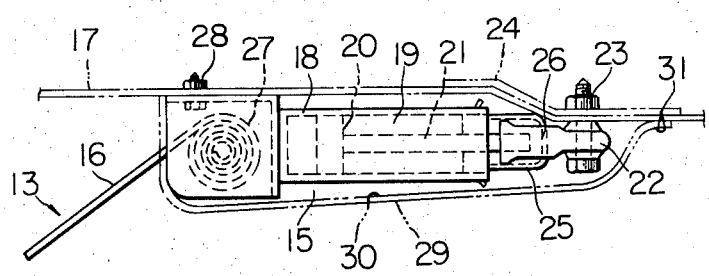
FIG. 3 is a side elevational view of the shock absorber shown in FIGS. 1 and 2.
Figure 4:
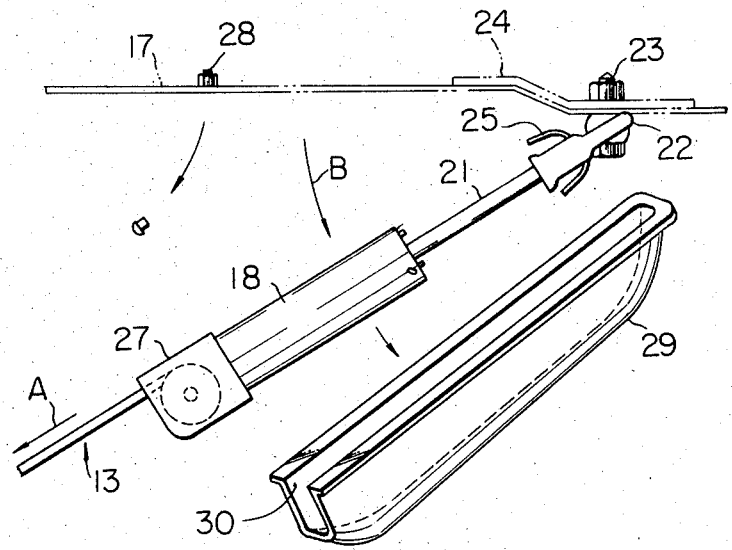
FIG. 4 is a view illustrating an operation of the shock absorber of FIG. 3.

The detailed construction of this assembly of the shock absorber 15 is illustrated in FIG. 3, wherein the shock absorber 15 is shown as mounted on the ceiling structure 17 for illustrative purposes only. Referring thus to FIG. 3, the assembly of the shock absorber 15 includes a cylinder body 18 having a fluid chamber 19 containing therein a fluid. A piston 20 is slidably disposed in the fluid chamber 19 of the cylinder body 18 and is connected to a connecting rod 21. The connecting rod 21 is connected at its leading end to a joint or coupling means 22, which is pivotally mounted on the roof structure 17 by a suitable known fastener means such as a bolt and a nut 23. The shock absorber 15 may be of any known construction such as one disclosed in, for example, U.S. Pat. No. 2,680,476 entitled "Hydraulic snubber for shoulder harness" and, therefore, a detail description of the same is omitted. Indicated at 24 is an anchor which is secured to the ceiling structure 17. The assembly of the shock absorber 15 further includes a destructible retaining means or release wire 25 which is shown U-shaped in FIG. 3. The U-shaped release wire 25 is inserted into a hole 26 formed in the coupling means 22 and connected at its end portions to a leading end of the cylinder body 18. As clearly shown in FIG. 4, the release wire 25 is destroyable when a predetermined magnitude of tension is applied thereto during the collision of the motor vehicle. A retracting means 27 may be provided in the shock absorber 15 and may be formed integral with the other end of the cylinder body 18, if desired. As shown, the retracting means 27 is connected to the leading end of the shoulder strap 16 of the seat belt 13 in a manner to maintain the shoulder strap 16 in a retracted condition. The retracting means 27 may comprise any conventional retracting device of the type which permits the effective length of the shoulder belt 16 to be changed, e.g. lengthened by exerting a slight pull thereon while, on the other hand, it is locked to prevent the shoulder belt from being unintentionally pulled out when the vehicle is suddenly decelerated or subjected to violent changes of direction. The retracting means of this type disclosed in U.S. Pat. No. 3,348,881 entitled "Fastening means for a three-point safety belt, particularly for motor vehicles." The retracting means 27 is secured at its suitable position to the ceiling structure 17 by a suitable releasable retaining means 28. The assembly of the shock absorber 15 thus constructed may be received in a housing member 29 which is formed with a longitudinally extending cavity 30.

When, now, the seat 11 is subjected to a sudden deceleration and consequently the vehicle occupant undergoes a sudden acceleration as during a collision condition of the motor vehicle, an increased tension is produced in the shoulder strap 16 by a force of inertia of the vehicle occupant who is flung away from the seat back 11b of the seat 11. This increased tension in the shoulder strap 16 causes the shock absorber 15 to be forced toward the lap belt (not shown in FIG. 4), that is, in a direction shown by an arrow A in FIG. 4. As a consequence, the retaining means 28 is broken or sheared so that the retracting means 27 integral with the cylinder body 18 is disconnected at one end from the roof structure 17 and moved downward, that is, in a direction shown by an arrow B in FIG. 4. At the same time, the destructible wire 25 is broken or sheared because of the tension applied to the shoulder strap 16 so that the cylinder body 18 is disconnected from the joint or coupling means 22 and accordingly the shock absorber 15 is made operative for absorbing the energy of the occupant during the collision condition of the motor vehicle. Under these circumstances, the housing member 29 is released away from the assembly of the shoulder strap 16 as seen by an arrow C IN FIG. 4. It may be noted in this instance that the housing member 29 is prevented from contacting the vehicle occupant by securing an end portion of the member 29 to the roof structure 17 as at 31 (see FIG. 3).

It should be appreciated that while the operation of the shock absorber 15 forming part of the safety device of the present invention is herein described under the assumption that the shock absorber 15 is mounted on the ceiling structure 17 of the motor vehicle, similar operation is obtained even where the shock absorber 15 is mounted on the floor pan 12 as in the embodiment of FIG. 1 and, therefore, the detailed description of the same is herein omitted for the sake of simplicity of illustration.

What is claimed is:

1. In a safety device for a motor vehicle having a ceiling structure, the combination comprising a seat belt extending over the seat portion of a seat and including a lap belt which extends over and across said seat portion and which is anchored to the floor pan of said motor vehicle and a shoulder strap which is anchored at one end to an intermediate portion of said lap belt and at the other end to said ceiling structure of said motor vehicle substantially over a seat back portion of said seat, retracting means connected to said other end of said shoulder strap, and a shock absorbing means disposed between said retracting means and said ceiling structure of said motor vehicle, said shock absorbing means having a cylinder for containing a fluid and with a piston and connecting rod movable therein, said cylinder being integrally connected at its one end to said retracting means and with said connecting rod projecting from the other end, retaining means for securing said retracting means on said ceiling structure, said retaining means being releasable when a predetermined magnitude of force is applied thereto during sudden deceleration of said motor vehicle, coupling means swingably connecting the end of the connecting rod projecting from said cylinder to said ceiling structure, and a second retaining means connected to said cylinder and to the portion of said connecting rod lying between said cylinder and said coupling means, said second retaining means also being releasable after said first retaining means is released.

* * * * *